United States Patent
Sundararaman et al.

(10) Patent No.: US 12,498,912 B1
(45) Date of Patent: *Dec. 16, 2025

(54) SYSTEM AND METHODS FOR FIRMWARE UPDATE MECHANISM

(71) Applicant: Marvell Asia Pte, Ltd., Singapore (SG)

(72) Inventors: Ramacharan Sundararaman, San Jose, CA (US); Nithyananda Miyar, San Jose, CA (US); Richard Taylor, Eagle, ID (US); James Eldredge, Meridian, ID (US)

(73) Assignee: Marvell Asia Pte Ltd, Singapore (SG)

( * ) Notice: Subject to any disclaimer, the term of this patent is extended or adjusted under 35 U.S.C. 154(b) by 1022 days.

This patent is subject to a terminal disclaimer.

(21) Appl. No.: 17/326,116

(22) Filed: May 20, 2021

Related U.S. Application Data

(63) Continuation-in-part of application No. 16/947,424, filed on Jul. 31, 2020, now Pat. No. 11,921,904.

(60) Provisional application No. 63/027,895, filed on May 20, 2020, provisional application No. 63/007,225, filed on Apr. 8, 2020.

(51) Int. Cl.
   *G06F 8/65* (2018.01)
   *G06F 21/44* (2013.01)
   *G06F 21/57* (2013.01)

(52) U.S. Cl.
   CPC ............... *G06F 8/65* (2013.01); *G06F 21/44* (2013.01); *G06F 21/572* (2013.01); *G06F 21/575* (2013.01); *G06F 2221/033* (2013.01)

(58) Field of Classification Search
   CPC ........ G06F 21/64; G06F 21/57; G06F 21/572; G06F 21/575; G06F 21/50; G06F 21/71
   See application file for complete search history.

(56) References Cited

U.S. PATENT DOCUMENTS

| | | | |
|---|---|---|---|
| 7,209,918 B2* | 4/2007 | Li | G06F 9/52 |
| 8,127,413 B2* | 3/2012 | Pu | G06F 21/577 |
| | | | 26/25 |
| 9,025,495 B1* | 5/2015 | Brown | H04L 41/082 |
| | | | 370/255 |
| 9,177,153 B1* | 11/2015 | Perrig | G06F 21/57 |
| 10,489,142 B1* | 11/2019 | Podgorsky | G06F 13/36 |

(Continued)

FOREIGN PATENT DOCUMENTS

| | | |
|---|---|---|
| CN | 110730159 B | 1/2022 |
| WO | 2018026841 A1 | 2/2018 |
| WO | 2019115993 A1 | 6/2019 |

*Primary Examiner* — Tae K Kim

(57) ABSTRACT

A new approach is proposed to support hardware-based update of a software (e.g., a firmware) of an electronic device in a non-functional state. Under the proposed approach, the software is stored securely on a resource (e.g., a non-volatile storge) protected by a hardware-based lock mechanism. A first agent acquires a lock and authenticate the software. When a boot failure (e.g. authentication of the software fails) of the electronic device happens, an alert indicating the failure is generated and sent to a second agent (e.g., a sideband master) through an alert mechanism. The second agent then acquires a lock from the hardware-based lock mechanism to obtain exclusive excess to the resource and update the software stored in the non-volatile storage through, e.g., block write and/or read operations. The second agent then verifies that the software has been updated successfully so that the electronic device becomes functionally again.

27 Claims, 2 Drawing Sheets

(56) References Cited

U.S. PATENT DOCUMENTS

| | | | |
|---|---|---|---|
| 10,628,579 B2* | 4/2020 | Boivie | G06F 21/53 |
| 10,776,102 B1* | 9/2020 | Dsouza | G06F 21/83 |
| 10,996,940 B1* | 5/2021 | Podgorsky | G06F 13/36 |
| 10,997,297 B1* | 5/2021 | Lin | H04L 9/30 |
| 11,520,891 B1* | 12/2022 | Karolitsky | H04L 9/3247 |
| 2008/0016410 A1* | 1/2008 | Pu | G06F 21/64 |
| | | | 714/47.2 |
| 2012/0023553 A1* | 1/2012 | Berg | G06F 21/577 |
| | | | 726/4 |
| 2012/0072734 A1* | 3/2012 | Wishman | G06F 21/64 |
| | | | 713/189 |
| 2012/0159041 A1* | 6/2012 | Saxena | G06F 21/78 |
| | | | 711/163 |
| 2012/0167106 A1* | 6/2012 | Shpeisman | G06F 9/52 |
| | | | 718/102 |
| 2012/0297057 A1* | 11/2012 | Ghosh | G06F 9/45558 |
| | | | 709/224 |
| 2014/0181573 A1* | 6/2014 | Goss | H04L 49/10 |
| | | | 710/305 |
| 2015/0373046 A1* | 12/2015 | Sapello | H04L 63/145 |
| | | | 726/23 |
| 2016/0072796 A1* | 3/2016 | Adam | H04L 63/0853 |
| | | | 713/159 |
| 2018/0091315 A1* | 3/2018 | Singhal | G06F 12/0238 |
| 2018/0096154 A1* | 4/2018 | Shivanna | G06F 21/572 |
| 2018/0349603 A1 | 12/2018 | Yamada et al. | |
| 2019/0042753 A1* | 2/2019 | Jreij | G06F 21/575 |
| 2019/0073478 A1* | 3/2019 | Khessib | G06F 13/4282 |
| 2019/0236271 A1* | 8/2019 | Shivanna | H04L 9/0863 |
| 2019/0306282 A1 | 10/2019 | Masputra et al. | |
| 2020/0134185 A1* | 4/2020 | Cho | G06F 21/602 |
| 2020/0143043 A1 | 5/2020 | Hong et al. | |
| 2020/0151336 A1* | 5/2020 | Maletsky | G06F 21/575 |
| 2020/0264988 A1 | 8/2020 | Branco | |
| 2020/0334359 A1* | 10/2020 | Zhou | G06F 8/654 |
| 2021/0157921 A1* | 5/2021 | Brown | G06F 21/575 |
| 2021/0232691 A1* | 7/2021 | Bishop | H04L 9/3236 |
| 2021/0240489 A1* | 8/2021 | Xie | G06F 21/572 |
| 2021/0240646 A1* | 8/2021 | Robertson | G06F 9/4406 |
| 2022/0179960 A1* | 6/2022 | Spangler | G06F 21/572 |

* cited by examiner

200

↓

Acquire by a first agent a first exclusive lock from a hardware-based lock unit to access a resource of an electronic device
202

↓

Authenticate by the first agent a software maintained in the resource protected by the hardware-based lock unit
204

↓

Send an alert to a second agent if authentication of the software fails
206

↓

Acquire by said second agent a second exclusive lock from the hardware-based lock unit to access the resource upon receiving the alert
208

↓

Update by the second agent the software maintained in the resource over an interface
210

↓

Verify that the software maintained in the resource has been updated successfully before releasing the second exclusive lock
212

FIG. 2

SYSTEM AND METHODS FOR FIRMWARE UPDATE MECHANISM

CROSS-REFERENCE TO RELATED APPLICATIONS

This application claims the benefit of U.S. Provisional Patent Application No. 63/027,895, filed May 20, 2020, which is incorporated herein in its entirety by reference.

This application is a continuation-in-part of U.S. patent application Ser. No. 16/947,424, filed Jul. 31, 2020, which claims the benefit of U.S. Provisional Patent Application No. 63/007,225, filed Apr. 8, 2020. Both of which are incorporated herein in their entireties by reference.

BACKGROUND

Device security is becoming more and more important given the prevalence use and the personal nature of electronic devices. Any gap in security of an electronic device (e.g., between time of check and time of use) may expose the electronic device to a malicious attack. In some cases, a gap exists between the time of check (TOC) and the time of use (TOU) and a potential TOC/TOU attack may occur after a firmware running on the electronic device has been authenticated at some point in time and before it is later being used by the electronic device. In some cases, the firmware is stored in a nonvolatile memory (e.g., a ROM, a flash device) of the electronic device and may be accessed and updated by multiple agents, e.g., ARM CPU cores, Power Management Controller (PMC) etc. In some cases, it is possible that the firmware running on the electronic device may be corrupted (e.g., causing authentication failure), rendering the electronic device inoperable. In order to reboot/recover the electronic device back to a working state, the firmware needs to be updated in a secure fashion without utilizing the previously corrupt firmware. Although a sideband firmware can be used to make changes and to repair the accessed/damaged firmware of the electronic device, the sideband firmware itself can also be accessed and utilized by an attacker to expose the electronic device to attacks.

Currently, password protection is often adopted to prevent unauthorized access to the firmware of electronic device. While password protection may provide some level of firmware protection and security, it is a weak protection and can be compromised. In general, software-enforced security mechanism is weak because an external attacker can compromise the software and expose the electronic device externally. For a non-limiting example, a flash memory can have password-based protection, but it is subject to comprise and is thus not secure.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2 depicts a flowchart of an example of a process to support hardware-based firmware update according to one aspect of the present embodiments.

DETAILED DESCRIPTION

Figure 1:
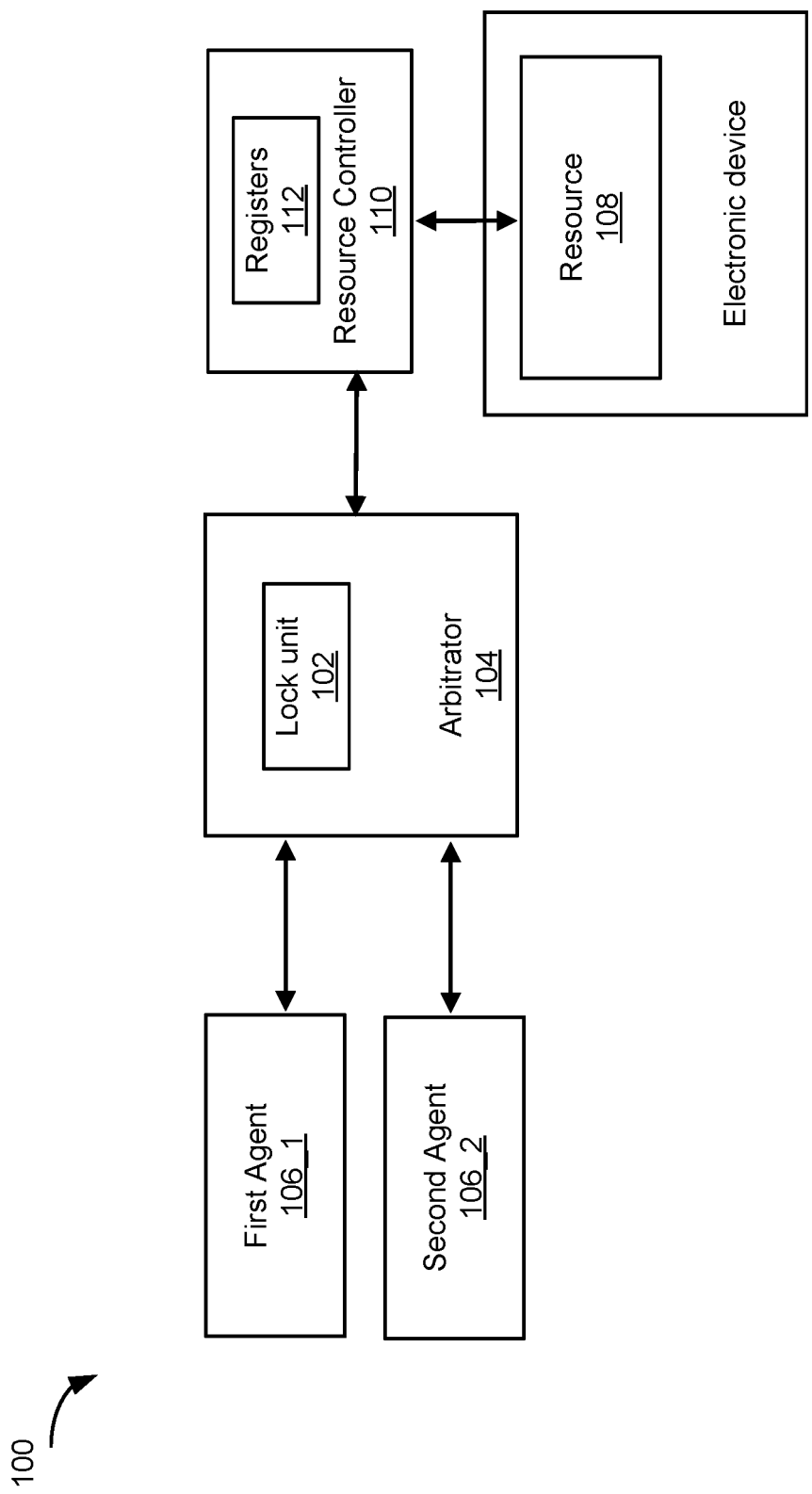
FIG. 1 depicts an example of a diagram of a hardware-based system configured to support firmware update according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

A new approach is proposed that contemplates systems and methods to support hardware-based update of a software (e.g., a firmware) of an electronic device in a non-functional state. Under the proposed approach, the software is stored securely on a resource (e.g., a non-volatile storge) protected by a hardware-based lock mechanism. A first agent acquires a lock and authenticates the software. When a boot failure (e.g. authentication of the software fails) of the electronic device happens, an alert indicating the failure is generated and sent to a second agent (e.g., a sideband master) through an alert mechanism. The second agent then acquires a lock from the hardware-based lock mechanism to obtain exclusive excess to the resource and update the software stored in the non-volatile storage through, e.g., block write and/or read operations. The second agent then verifies that the software has been updated successfully so that the electronic device becomes functionally again.

Under the proposed approach, the software of the electronic device in a non-functional state is updated or recovered directly by the agent without assistance of any firmware (which may have been corrupted) on the electronic device. In fact, a new firmware can be updated and/or restored on the electronic device by the agent even when there is no firmware previously installed on the electronic device. For a non-limiting example, if no firmware image is available on a brick device, the device is unlocked for access and a sideband agent can make a firmware update to the device. Additionally, since the lock mechanism is hardware enforced, the security of the firmware on the resource cannot be easily compromised.

Although a firmware stored in a non-volatile storage is used as a non-limiting example of a software in a resource in the embodiments described below, it is appreciated that the same or similar approach/mechanism is equally applicable to update to other types of software and/or in other types of resources to strengthen their securities.

FIG. 1 depicts an example of a diagram of a hardware-based system 100 to support firmware update. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the hardware-based system 100 includes a hardware-based lock unit 102, an arbitrator unit 104, one or more agents/components 106s, and a resource 108. Each of these components in the hardware-based system 100 is a dedicated hardware block/component or a software running on such hardware block/component. In some embodiments, one or more of these components are programmable by a user at a host (not shown) via software instructions for various operations. When the software instructions are executed, the one or more hardware components becomes a special purposed hardware component for practicing certain machine learning functions.

In the example of FIG. 1, each of the one or more agents 106s is a hardware component or a software component running on a hardware. For a non-limiting example, one of the one or more agents 106s can be a software component, e.g., a sideband master e.g. Baseboard Management Controller (BMC) configured to make changes to, update, and/or repair a firmware of an electronic device. For another non-limiting example, one of the one or more agents 106s can be a component of a processor/processing core such as an ARM core as discussed below.

In the example of FIG. 1, the resource 108 can be but is not limited to a nonvolatile storage device such as a flash device that stores and maintains certain data or software (e.g., a firmware) to be accessed by the agents 106s. In the example of FIG. 1, the one or more agents 106s are each configured to request access to the resources 108 during operation. In some embodiments, the one or more agents 106s are configured to access the resource 108 via a resource controller 110 (e.g., a non-volatile storage controller), which for a non-limiting example, can be a Serial Peripheral Interface (SPI) controller, wherein the resource controller 110 is configured to control access to the resource 108 by the one or more agents/components 106s based on specified and identified SPI slots/addresses of the resources. Here, SPI is an interface bus commonly used to send data between the agents 106s and the resources 108s. In some embodiments, the SPI controller utilizes separate clock and data lines, along with a select line to choose the resource 108 to control access to. For a non-limiting example, the resource controller 110 can be a SPI flash access controller configured to control access to a flash device/drive (a non-limiting example of a resource 108) by the agents 106s.

In some embodiments, one of the agents 106_1 requesting access to a resource 108, e.g., a flash device, is a component on a processing core (e.g., ARM), e.g., a Trusted/Secure Boot ROM or Code (TBR), wherein the TBR 106_1 is configured to access and verify a firmware, e.g., a secondary boot image, of the electronic device stored on the flash device 108. When being executed by a secondary boot loader (SSBL) (which location is determined by the TBR 106_1), the firmware reboots the electronic device. In some embodiments, the TBR 106_1 running on the ARM core is configured to set up its data and go through a hard-coded interface (e.g., PCIe PHY) initialization sequence up on startup. After this startup sequence is complete, the TBR 106_1 is configured to determine the SPI slot/address of the flash device to be accessed for the secondary boot image. Once the TBR 106_1 determines which SPI slot to access the resource 108 (e.g., the flash device), the TBR 106_1 is configured to acquire an exclusive lock of the resource 108 from the arbitrator 104. If the resource 108 is in an unlocked state, i.e., not accessed by another agent, the arbitrator 104 is configured to create a lock identification/ID and set a locked state (e.g., a bit of the hardware lock unit 102 associated with the arbitrator 104), indicating that the resource 108 is now locked. The lock ID is then saved in the hardware lock unit 102 and provided to the TBR 106_1. The TBR 106_1 now has exclusive access to the firmware stored in the flash device 108 via the SPI controller 110. In some embodiments, the TBR 106_1 is configured to change the lock ID and update the lock unit 102 accordingly while the TBR 106_1 is in possession of the exclusive lock in order to allow or deny another agent 106_2 (e.g., sideband firmware) from accessing the flash drive.

In some embodiments, after acquiring the exclusive lock to access the flash device, the TBR 106_1 is configured to authenticate the firmware stored in the flash device 108 by checking a signature of the firmware and then transfers control to the firmware in the flash device 108 if the signature is verified. In some embodiments, if there is no valid firmware available on the flash drive 108 under the so-called brick device scenario, the TBR 106_1 is configured to check and attempt to boot from any of the possible SPI slots/addresses after acquiring exclusive lock to access the flash drive 108. After authenticating the firmware, the TBR 106_1 is configured to release the exclusive lock so that another agent 106_2 (e.g., a sideband firmware) can lock the resource 108 and update the firmware in the flash device.

In some embodiments, if the authentication of the firmware fails or firmware stored in the flash device 108 fails to boot correctly, e.g., if the electronic device experiences a boot failure, the lock on flash device 108 is released and the boot process starts all over again. In some embodiments, the TBR 106_1 is configured to send an alert to another agent 106_2, which can be but is not limited to a sideband master, e.g. Baseboard Management Controller (BMC). Upon accepting the alert from the TBR 106_1, the sideband master 106_2 is then configured to acquire an exclusive lock to get exclusive access to the resource 108 after TBR 106_1 has released the lock. Note that as the holder of the exclusive lock to the flash device 108, the sideband master 106_2 has full read and write access to the entire flash device 108. In some embodiments, once the exclusive lock to the flash device 108 has been acquired, the sideband master 106_2 is configured to update the firmware (e.g., the secondary boot image) stored in the flash device 108 before releasing the lock.

In some embodiments, the sideband master 106_2 is configured to update the firmware stored in the flash device 108 over a sideband interface via a block write operation that writes to the flash device 108 in one or more blocks/chunks each of, e.g., 64B in size. In some embodiments, the sideband master 106_2 is configured to issue a set of block write commands in, e.g., 64B, chunks to program one or more registers 112 of the resource controller 110 that are specific to control access to the non-volatile storage 108. In some embodiments, the sideband master 106_2 is configured to update the firmware stored in the flash device 108 up to the size of the sector in the flash device 108 to be updated by issuing one or more of the following commands:

A sideband write command to write an address to a write address register among the registers 112 in the resource controller 110 for the firmware update;

A sideband block write command to write data to the non-incrementing address at, e.g., 64B chunk size. In some embodiment, no additional write command is need when writing to a First-in First-Out (FIFO) non-volatile storage 108.

A sideband block read command to the non-incrementing address at, e.g., 64B chunk size to verify that the firmware has been successful updated.

After the firmware has been successfully updated, the sideband master 106_2 is configured to notify the TBR 106_1 to reset and to conduct a boot-time authentication of the newly updated firmware in order to reboot the electronic device.

In some embodiments, the hardware-based system 100 provides a mutually exclusive locking mechanism to the resource 108 when more than one agents 106 attempt to access the same resource 108. Specifically, when the second agent 106_2 (e.g., the sideband master) requests access to the same resource 108, the second agent 106_2 is configured to provide a lock ID to the arbitrator 104. If the resource 108 is in a locked state (has been locked by the first agent 1061) and the lock ID provided by the second agent 106_2 matches the lock ID set for the resource 108, the second agent 106_2 is then granted access to the resource 108 by the arbitrator 104. If there is a mismatch between the lock ID provided by the second agent 106_2 and the lock ID set for the resource 108 and maintained in the hardware-based lock unit 102, the second agent 106_2 is denied access to the resource 108, thus preventing the resource from being accessed by another agent/component. As such, the mutually exclusive locking scheme between the access paths of different agents 106s (e.g., the first agent/TBR 106_1 and the second agent/sideband master 106_2) prevents concurrent access to the resource 108 by a sideband firmware, which could potentially be utilized by an attacker to launch a TOC/TOU attack by modifying the firmware image in the flash device through a sideband channel. In some embodiments, under the race to lock scenario where both agents 106s are racing to the access the resource 108, the arbitrator 104 is configured to enable the first agent 106_1 (e.g., TBR of the ARM core) to lock the resource 108 first before the second agent 106_2 (e.g., the sideband firmware) does during cold booting as the TBR of the ARM core may act much faster than the sideband firmware under the mutually exclusive locking mechanism.

In some embodiments, the exclusive lock on the resource 108 can only be released by the agent 106 that has acquired the exclusive lock on the resource 108. Specifically in the non-limiting example discussed above, once the first agent 106_1/TBR has taken the exclusive lock on flash device to be accessed by via the SPI controller, the lock on the flash device can only be released by the first agent 106_1 that has acquired the lock on the flash drive first and no other agent 106 (e.g., the second agent 106_2/the sideband firmware) can acquire a lock on the same resource 108 until the exclusive lock on the resource 108 has been explicitly released by the first agent 106_1. Once the first agent 106_1 releases the exclusive lock on the resource 108, it is configured to notify the arbitrator 104 accordingly. Upon receiving the lock releasing notification from the first agent 106_1, the arbitrator 104 is configured to clear the locked state of the hardware-based lock unit 102 by, e.g., reset a corresponding bit of the hardware-based lock unit 102.

In some embodiments, the second agent 106_2 which intends to acquire access to a resource 108 that is currently locked by the first agent 106_1 has to wait until the lock is released by the first agent 106_1. In some embodiments, the second agent 106_2 is configured to check the locked state of the hardware lock unit 102 associated with and maintained by the arbitrator 104 either periodically or as needed. In some embodiments, the arbitrator 104 is configured to notify the second agent 106_2 and/or other agents that are waiting for the same resource 108 once the first agent 106_1 releases the exclusive lock on the resource 108 and the lock status has been reset. The second and/or the other agents waiting to access the resource 108 can then acquire a new lock at the resource 108. In some embodiments, the arbitrator 104 is configured to create a new lock ID upon granting the second and/or the other agents a new lock to access the resource while discarding the lock IDs previously used by other agents (e.g., the first agent 1061) to lock the resource 108. This prevents an attacker from utilizing a previously used lock ID to gain unauthorized access to the resource 108.

FIG. 2 depicts a flowchart 200 of an example of a process to support hardware-based firmware update. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where a first exclusive lock is acquired by a first agent from a hardware-based lock unit to access a resource of an electronic device. The flowchart 200 continues to block 204, where a software maintained in the resource protected by the hardware-based lock unit is authenticated by the first agent. The flowchart 200 continues to block 206, where an alert is sent to a second agent if authentication of the software fails. The flowchart 200 continues to block 208, where a second exclusive lock is acquired by said second agent from the hardware-based lock unit to access the resource upon receiving the alert. The flowchart 200 continues to block 210, where the software maintained in the resource is updated by the second agent over an interface. The flowchart 200 ends at block 212, where the software maintained in the resource is verified to have been updated successfully before releasing the second exclusive lock.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A hardware-based system, comprising:
a first agent configured to
acquire a first exclusive lock from a hardware-based lock unit to access a resource of an electronic device, wherein the hardware-based lock unit is configured to maintain a lock identification associated with the resource associated with the first exclusive lock;
change the lock identification to an updated lock identification when the first agent is in possession of the first exclusive lock;
update the hardware-based lock unit with the updated lock identification when the first agent is in possession of the first exclusive lock;

authenticate a software maintained in the resource protected by the hardware-based lock unit; and send an alert to a second agent if authentication of the software fails; and said second agent configured to acquire a second exclusive lock from the hardware-based lock unit to access the resource responsive to receiving the alert, wherein the hardware-based lock unit is configured to maintain another lock identification associated with the resource associated with the second exclusive lock;

update the software maintained in the resource over an interface; and verify that the software maintained in the resource has been updated successfully before releasing the second exclusive lock, wherein each of the first agent and the second agent run on a hardware.

2. The hardware-based system of claim 1, wherein:
the software is a firmware of the electronic device, wherein the firmware is utilized to boot the electronic device.

3. The hardware-based system of claim 1, wherein:
the resource is a nonvolatile storage device configured to store and maintain the software of the electronic device.

4. The hardware-based system of claim 1, wherein:
the first agent is a trusted boot component on a processing core.

5. The hardware-based system of claim 1, wherein:
the first agent is configured to check a signature of the software stored in the resource and transfer control to the software to reboot the electronic device if the signature is verified.

6. The hardware-based system of claim 1, wherein:
the first agent is configured to release the first exclusive lock, and wherein the second agent is configured to lock the resource and update the software in the resource after the first exclusive lock is released.

7. The hardware-based system of claim 1, wherein:
the second agent is a sideband software.

8. The hardware-based system of claim 7, wherein:
the second agent is configured to update the software stored in the resource over a sideband interface via a block write operation that writes to the resource in one or more blocks.

9. The hardware-based system of claim 1, wherein:
the second agent is configured to notify the first agent to conduct a boot-time authentication of the updated software in order to reboot the electronic device.

10. The hardware-based system of claim 1, further comprising:
a resource controller configured to control access to the resource by one of the first or second agents based on a slot and/or an address of the resource.

11. The hardware-based system of claim 10, wherein:
the second agent is configured to program one or more registers within the resource controller that are specific to control access to the resource.

12. The hardware-based system of claim 1, further comprising:
said hardware-based lock unit associated with the resource, wherein the hardware-based lock unit is configured to maintain a locked state for the resource.

13. The hardware-based system of claim 12, further comprising:
an arbitrator associated with said hardware-based lock unit and configured to create a first lock identification and set the locked state for the resource if the resource is in an unlocked state, indicating that the resource is locked;

store the first lock identification and/or the lock state in the hardware-based lock unit;

provide the first lock identification to the first agent to have the first exclusive lock to access the resource;

grant access to the resource by the second agent if the resource is in the locked state and a second lock identification provided by the second agent matches the first lock identification that is stored on the hardware-based lock unit; and deny access by the second agent to the resource responsive to a mismatch between the second lock identification provided by the second agent and the first lock identification stored on the hardware-based lock unit.

14. The hardware-based system of claim 13, wherein:
the arbitrator is configured to set the locked state by setting a bit of the hardware lock unit associated with the resource.

15. The hardware-based system of claim 13, wherein:
the arbitrator is configured to enable the first agent to lock the resource first before the second agent does under a mutually exclusive locking mechanism.

16. A method, comprising:
acquiring a first exclusive lock from a hardware-based lock unit to access a resource of an electronic device, wherein the hardware-based lock unit is configured to maintain a lock identification associated with the resource associated with the first exclusive lock;

changing the lock identification to an updated lock identification when the first agent is in possession of the first exclusive lock;

updating the hardware-based lock unit with the updated lock identification when the first agent is in possession of the first exclusive lock;

authenticating a software maintained in the resource protected by the hardware-based lock unit;

sending an alert if authentication of the software fails;

acquiring a second exclusive lock from the hardware-based lock unit to access the resource responsive to receiving the alert, wherein the hardware-based lock unit is configured to maintain another lock identification associated with the resource associated with the second exclusive lock;

updating the software maintained in the resource over an interface; and verifying that the software maintained in the resource has been updated successfully before releasing the second exclusive lock.

17. The method of claim 16, further comprising:
checking a signature of the software stored on the resource and transferring control to the software to reboot the electronic device if the signature is verified.

18. The method of claim 16, further comprising:
releasing the first exclusive lock and wherein another agent locks the resource and updates the software in the resource after the first exclusive lock is released.

19. The method of claim 16, further comprising:
updating the software stored in the resource over a sideband interface via a block write operation that writes to the resource in one or more blocks.

20. The method of claim 16, further comprising:
conducting a boot-time authentication of the updated software in order to reboot the electronic device.

21. The method of claim 16, further comprising:
controlling access to the resource based on a slot and/or an address of the resource.

22. The method of claim 16, further comprising:
programming one or more registers that are specific to control access to the resource.

23. The method of claim 16, further comprising:
maintaining a locked state for the resource via the hardware-based lock unit.

24. The method of claim 23, further comprising:
creating a first lock identification and set the locked state for the resource if the resource is in an unlocked state, indicating that the resource is locked;
storing the first lock identification and/or the lock state in the hardware-based lock unit;
providing the first lock identification to a first agent to have the first exclusive lock to access the resource;
granting access to the resource by a second agent if the resource is in the locked state and a second lock identification provided by the second agent matches the first lock identification that is stored on the hardware-based lock unit;
denying access by the second agent to the resource responsive to a mismatch between the second lock identification provided by the second agent and the first lock identification stored on the hardware-based lock unit.

25. The method of claim 24, further comprising:
setting the locked state by setting a bit of the hardware lock unit associated with the resource.

26. The method of claim 24, further comprising:
enabling the first agent to lock the resource first before the second agent does under a mutually exclusive locking mechanism.

27. A hardware-based system, comprising:
a first means for
acquiring a first exclusive lock from a hardware-based lock unit to access a resource of an electronic device, wherein the hardware-based lock unit is configured to maintain a lock identification associated with the resource associated with the first exclusive lock;
changing the lock identification to an updated lock identification when the first agent is in possession of the first exclusive lock;
updating the hardware-based lock unit with the updated lock identification when the first agent is in possession of the first exclusive lock;
authenticating a software maintained in the resource protected by the hardware-based lock unit;
sending an alert to a second means if authentication of the software fails;
said second means for
acquiring a second exclusive lock from the hardware-based lock unit to access the resource responsive to receiving the alert, wherein the hardware-based lock unit is configured to maintain another lock identification associated with the resource associated with the second exclusive lock;
updating the software maintained in the resource over an interface;
verifying that the software maintained in the resource has been updated successfully before releasing the second exclusive lock.

* * * * *